United States Patent
Yang et al.

(10) Patent No.: US 11,611,958 B2
(45) Date of Patent: Mar. 21, 2023

(54) METHOD, USER EQUIPMENT AND BASE STATION FOR INITIALIZING SECONDARY CELL IN CELLULAR COMMUNICATION SYSTEM

(75) Inventors: Tao Yang, Shanghai (CN); Seau Sian Lim, Swindon (GB)

(73) Assignee: Nokia Technologies Oy, Espoo (FI)

( * ) Notice: Subject to any disclaimer, the term of this patent is extended or adjusted under 35 U.S.C. 154(b) by 387 days.

(21) Appl. No.: 14/009,913

(22) PCT Filed: Mar. 28, 2012

(86) PCT No.: PCT/IB2012/000880
§ 371 (c)(1),
(2), (4) Date: Oct. 4, 2013

(87) PCT Pub. No.: WO2012/137074
PCT Pub. Date: Oct. 11, 2012

(65) Prior Publication Data
US 2014/0023054 A1   Jan. 23, 2014

(30) Foreign Application Priority Data
Apr. 4, 2011 (CN) .......................... 201110085846.6

(51) Int. Cl.
| | | |
|---|---|---|
| H04W 72/04 | (2009.01) | |
| H04W 72/0446 | (2023.01) | |
| H04W 74/08 | (2009.01) | |
| H04W 56/00 | (2009.01) | |
| H04W 72/0453 | (2023.01) | |

(52) U.S. Cl.
CPC ..... *H04W 72/0446* (2013.01); *H04W 56/0045* (2013.01); *H04W 74/0891* (2013.01); *H04W 72/0453* (2013.01)

(58) Field of Classification Search
None
See application file for complete search history.

(56) References Cited

U.S. PATENT DOCUMENTS

| | | |
|---|---|---|
| 2010/0061302 A1 | 3/2010 | Ishii et al. |
| 2010/0240372 A1 | 9/2010 | Wu |
| 2010/0291939 A1 | 11/2010 | Jen et al. |

(Continued)

FOREIGN PATENT DOCUMENTS

| | | |
|---|---|---|
| CN | 101247647 A | 8/2008 |
| CN | 101772150 | 7/2010 |

(Continued)

OTHER PUBLICATIONS

European Search Report dated Oct. 28, 2014.

(Continued)

*Primary Examiner* — Kodzovi Acolatse
*Assistant Examiner* — Manuel Rangel
(74) *Attorney, Agent, or Firm* — Lippes Mathias LLP (57) ABSTRACT

Embodiments provide a method for initializing a secondary cell in a cellular communication system. The method may comprise: receiving from a base station a Radio Resource Control RRC configuration request for the secondary cell to perform a RRC configuration; and in response to receiving the RRC configuration request, performing uplink synchronization with the base station in the secondary cell.

26 Claims, 4 Drawing Sheets

(56) References Cited

U.S. PATENT DOCUMENTS

| | | | |
|---|---|---|---|
| 2010/0311415 A1* | 12/2010 | Hamabe et al. ............... 455/425 |
| 2011/0103332 A1* | 5/2011 | Kuo ................. 370/329 |
| 2011/0134774 A1* | 6/2011 | Pelletier .............. H04W 52/365 |
| | | | 370/252 |
| 2011/0300856 A1 | 12/2011 | Aminaka |
| 2012/0176891 A1* | 7/2012 | Chin et al. .................... 370/221 |
| 2012/0218970 A1* | 8/2012 | Westberg et al. ............. 370/331 |
| 2012/0243514 A1* | 9/2012 | Wu ................... H04W 74/0833 |
| | | | 370/336 |
| 2012/0257510 A1* | 10/2012 | Jeong ................... H04L 5/0098 |
| | | | 370/242 |
| 2012/0314635 A1* | 12/2012 | Lee .......................... H04L 5/001 |
| | | | 370/311 |
| 2012/0314675 A1* | 12/2012 | Vujcic .................... H04L 5/001 |
| | | | 370/329 |
| 2012/0327910 A1* | 12/2012 | Dalsgaard ............ H04L 5/0098 |
| | | | 370/335 |
| 2013/0021902 A1* | 1/2013 | Du et al. ........................ 370/228 |
| 2013/0058315 A1* | 3/2013 | Feuersanger et al. ........ 370/336 |
| 2013/0153298 A1* | 6/2013 | Pietraski et al. ................ 175/45 |
| 2013/0182687 A1* | 7/2013 | Ng .................... H04W 56/0015 |
| | | | 370/336 |
| 2013/0250902 A1 | 9/2013 | Xu et al. |
| 2014/0023043 A1* | 1/2014 | Yang ................. H04W 36/0072 |
| | | | 370/331 |

FOREIGN PATENT DOCUMENTS

| | | |
|---|---|---|
| CN | 102036411 | 4/2011 |
| EP | 2 323 304 | 5/2011 |
| EP | 2 141 956 | 8/2013 |
| JP | 2010220214 | 9/2010 |
| WO | WO 2008/084622 | 7/2008 |
| WO | WO 2008/084694 A1 | 7/2008 |
| WO | WO 2010/075778 | 7/2010 |
| WO | WO 2010/103725 | 9/2010 |

OTHER PUBLICATIONS

Mediatek, "Discussion on Activation/Deactivation", R2-103628, 3GPP TSG-RAN WG2 Meeting #70bis, Stockhold, Sweden, Jun. 28-Jul. 2, 2010, pp. 1-6.

Alcatel-Lucent et al., SCell configuration for multiple TA, $3^{rd}$ Generation Partnership Project (3GPP), TSG-RAN WG2#73bis, R2-112210, 2 pages, Shanghai, China, Apr. 11-15, 2011.

"$3^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.1.0, pp. 1-290, Mar. 2011.

International search Report for PCT/IB2012/000880 dated Sep. 13, 2012.

NTT DoCoMo, Inc., "CA Support for multi-TA", 3GPP TSG-RAN2#69, R2-101567, Feb. 22-26, 2010, San Francisco, U.S.A.

* cited by examiner

METHOD, USER EQUIPMENT AND BASE STATION FOR INITIALIZING SECONDARY CELL IN CELLULAR COMMUNICATION SYSTEM

FIELD OF THE INVENTION

The present invention relates to a wireless communication field, and more particularly to a method, a user equipment and a base station for initializing a secondary cell in a cellular communication system.

BACKGROUND OF THE INVENTION

LTE Release 10, i.e. Long Term Evolution-Advanced (LTE-Advanced, called LTE-A for short) introduces carrier aggregation technology to the cellular communication system to support working in a higher bandwidth. The carrier aggregation may serve a User Equipment (UE) by integrating a number of discrete frequency bands. In the LTE Release 10, a Secondary Cell (called SCell for short) may be added via a RRC Connection Reconfiguration message after a Primary Cell (called PCell for short) is established via a RRC Connection establishment/re-establishment message. After a successful reconfiguration, the secondary cell is in a configured but deactivated state. The secondary cell may then be activated by MAC CE at any later time.

In LTE Release 11, after a secondary cell is successfully configured via a RRC Connection Reconfiguration procedure, the secondary cell may have the same timing advance (called TA for short) as the primary cell and thus the user equipment does not need to perform an initial timing alignment. This case is substantially the same as applying uplink carrier aggregation in Release 10, but is different from scenarios such as a non-collocated site (e.g. Remote Radio-frequency Head RRH) and a frequency repeater. In most deployment scenarios of Release 11, the message structure and procedure are the same as those in Release 10. The secondary cell may be configured and deactivated like in Release 10 after a successful reconfiguration, which is based on an assumption that the network has known the specific deployment scenario. However, in some specific deployment scenarios such as uncoordinated, non-collocated site and frequency repeater scenarios, an initial timing alignment for the secondary cell needs to be performed after a secondary cell is configured. Accordingly, an appropriate TA should be available before any uplink transmission happens, so as to perform uplink synchronization with the secondary cell.

In Release 11, the research on the initialization of a secondary cell is very limited at present, and there is no solution to perform uplink synchronization of a user equipment and a base station on the secondary cell, let alone solve the problems such as how to improve the RRC reconfiguration procedure and/or how to obtain an initial timing alignment for the secondary cell by using a PDCCH order signaling. For example, in Release 10, the PDCCH order signaling may be transmitted merely on the primary cell, while in Release 11, how to apply the PDCCH order signaling to the uplink synchronization for a secondary cell is to be researched. Thus, a solution is needed to efficiently perform the uplink synchronization of a user equipment and a base station on the secondary cell.

SUMMARY OF THE INVENTION

For the above problem, the present invention provides a method, a user equipment and a base station for initializing a secondary cell in a cellular communication system.

According to the first aspect of the present invention, there is provided a method for initializing a secondary cell in a cellular communication system. The method may comprise: receiving from a base station a Radio Resource Control RRC configuration request for a secondary cell to perform a RRC configuration; and in response to receiving the RRC configuration request, performing uplink synchronization with the base station in the secondary cell.

According to the second aspect of the present invention, there is provided a method for initializing a secondary cell in a cellular communication system. The method may comprise: sending to a user equipment a Radio Resource Control RRC configuration request so that the user equipment performs a RRC configuration and performs uplink synchronization between the user equipment and a base station in the secondary cell.

According to the third aspect of the present invention, there is provided a user equipment for initializing a secondary cell in a cellular communication system. The user equipment may comprise: receiving means configured to receive from a base station a Radio Resource Control RRC configuration request for the secondary cell to perform the RRC configuration; and synchronizing means configured to perform, in response to receiving the RRC configuration request, uplink synchronization with the base station in the secondary cell.

According to the fourth aspect of the present invention, there is provided a base station for initializing a secondary cell in a cellular communication system. The base station may comprise transmitting means, which may comprise: a RRC configuration request sending unit configured to send a Radio Resource Control RRC configuration request to a user equipment so that the user equipment performs a RRC configuration and performs uplink synchronization between the user equipment and a base station in the secondary cell.

Other features and advantages of the present invention will be obvious by the following descriptions of preferred embodiments for explaining the principle of the present invention, in conjunction with the accompanying drawings.

BRIEF DESCRIPTION OF THE DRAWINGS

Other objects and effects of the present invention will become clearer and easier to understand by making references to the following description in conjunction with the accompanying drawings and along with more comprehensive understanding of the present invention, in which.

In all of the accompanying drawings, the same reference signs represent having identical, similar or corresponding features or functions.

DETAILED DESCRIPTION OF EMBODIMENTS

The flowcharts and block diagrams in the accompanying drawings illustrate architectures, functions and operations that may be achieved by a system, method and apparatus according to various embodiments of the present invention. On this point, each block in the flowcharts or block diagrams may represent a module, a program segment or a portion of a code, and the module, the program segment or the portion of the code comprises one or more executable instructions for implementing a prescribed logic function. It should be noted that: in some optional implementations, the functions marked in the blocks may happen in an order different from that marked in the accompanying drawings. For example, two successive blocks actually may be performed substantially in parallel, and some times they may be performed in a reversed order, which depends on the related functions. It should also be noted that: each block in the block diagrams and/or flowcharts and a combination of blocks in the block diagrams and/or flowcharts may be achieved by a dedicated hardware-based system performing prescribed functions or operations, or by a combination of a dedicated hardware and a computer instruction. It should be understood that: the accompanying drawings and embodiments of the present invention only perform an exemplary function, rather than limiting the protection scope of the present invention. In the following, the present invention will be described in more detail with reference to the accompanying drawings.

In the method for initializing a secondary cell in a cellular communication system in the present invention, a base station may send to a user equipment a Radio Resource Control RRC configuration request for a secondary cell, and the user equipment, after receiving a RRC configuration request, may perform uplink synchronization with the base station in the secondary cell in accordance with the RRC configuration request. If the user equipment fails to successfully perform the uplink synchronization with the base station in the secondary cell after receiving the RRC configuration request, e.g. the user equipment does not go to perform the uplink synchronization or fails in the process of performing the uplink synchronization, the user equipment may ignore contents for the secondary cell in the cell active MAC signaling and/or does not make a downlink measurement and report for the secondary cell. In this case, the base station may transmit a PDCCH order signaling to the user equipment to thereby retrigger the uplink synchronization between the user equipment and the base station in the secondary cell.

In the present invention, the user equipment may be various types of terminals, e.g. a mobile phone, a Personal Digital Assistant (PDA), a portable computer, etc., and the base station for example may be eNodeB (or eNB), etc.

In the present invention, the primary cell is always in an activated state, and it may be configured with dedicated resources such as PUCCH, SPS, etc. The secondary cell may have an active state or a deactive state, but does not have PUCCH and SPS resources.

Figure 1:
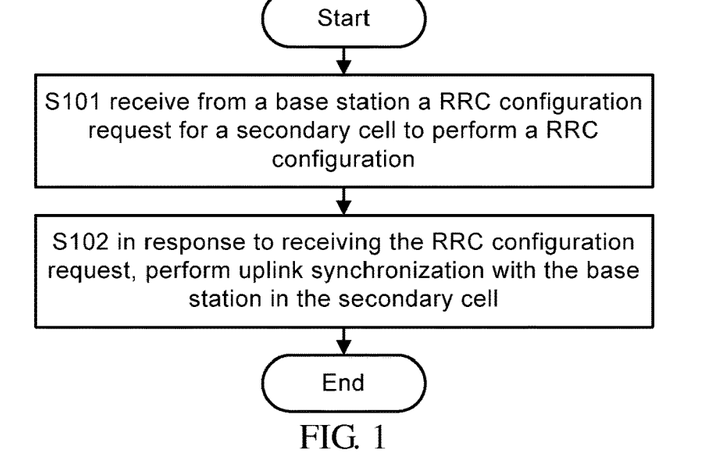
FIG. 1 is a flowchart of a method for initializing a secondary cell in a cellular communication system, according to one embodiment of the present invention.

FIG. 1 is a flowchart of a method for initializing a secondary cell in a cellular communication system, according to one embodiment of the present invention. The embodiment illustrated by FIG. 1 may be performed by a user equipment in a cellular communication system or by any other appropriate devices available to those skilled in the art.

In Step S101, it is received from a base station an RRC configuration request for a secondary cell to perform a RRC configuration.

In Step S102, in response to receiving the RRC configuration request, uplink synchronization with the base station in the cell is performed.

In one embodiment according to the present invention, whether to perform uplink synchronization with a base station in a cell may be determined based on a RRC configuration request.

In another embodiment according to the present invention, whether a dedicated preamble has been set in a RRC configuration request may be determined. When it is determined that a dedicated preamble has been set, performing a non-contention uplink synchronization process, and when it is determined that no dedicated preamble has been set, performing a contention uplink synchronization process.

In another embodiment according to the present invention, whether to use Timing Advance (TA) information of a configured secondary cell or primary cell may be determined based on a RRC configuration request, and when it is determined not to use the Timing Advance (TA) information of the configured secondary cell, performing a random access process for the secondary cell. The random access process may be the following process (hereinafter referred to as a PRACH process): UE transmits a random access preamble to a base station on a Physical Random Access Channel (PRACH), and the base station transmits corresponding TA information to the UE; for a contention-based random access process, mechanism for solving a conflict may also be included. In this embodiment, if it is determined to use the Timing Advance (TA) information of the configured secondary cell, the TA information may be used for uplink transmission of the secondary cell. For example, the field indicating whether to use the existing TA information in a RRC configuration message is set as corresponding TA information or a corresponding cell identity, e.g. a cell index. In addition, if the field indicating whether to use the existing TA information in a RRC configuration message is empty (e.g. NULL), it means that the base station does not indicate that the user equipment uses any known TA information, and at this time it is possible that the base station does not know the future action of the user equipment and thus does not indicate specific actions of the user equipment.

In another embodiment according to the present invention, whether it is necessary to configure a plurality of secondary cells may be determined based on a RRC configuration request. In response to determining that it is necessary to configure a plurality of secondary cells, whether to use the same TA information for the plurality of secondary cells is determined. If the same TA information is used for the plurality of secondary cells, performing random access processes simultaneously or one by one for each of the plurality of secondary cells, and obtaining TA information based on the firstly and successfully performed random access process for use in uplink transmission of each secondary cell. If the same TA information is not used for the plurality of secondary cells, random access processes are performed simultaneously or one by one for each of the plurality of secondary cells to obtain TA information corresponding to each secondary cell for use in uplink transmission of each secondary cell.

In another embodiment according to the present invention, after performing uplink synchronization, a message that a RRC configuration is completed (hereinafter referred to as a RRC configuration complement message) is sent to a base station. In this embodiment, performing the uplink synchronization and sending the RRC configuration complement message have a strict order, that is, the uplink synchronization is performed before sending the RRC configuration complement message. In addition, in this embodiment, the RRC configuration complement message is sent in a configured secondary cell, which will be described in detail in the embodiment illustrated by FIG. 2.

In another embodiment according to the present invention, a user equipment may, after completing a RRC configuration, send to a base station a message that the RRC configuration is completed, wherein the message that the RRC configuration is completed is sent independent from performing uplink synchronization. That is, performing the uplink synchronization and sending the RRC configuration complement message do not have a strict order, and the two are performed without interference or influence with each other. The uplink synchronization may be performed either before sending the RRC configuration complement message, or after performing the uplink synchronization. In addition, the RRC configuration complement message may be sent in any cell in an activated state (e.g. an activated secondary cell or an activated primary cell), without being limited to an initialized secondary cell, which will be described in detail in the embodiment illustrated by FIG. 3.

In one embodiment according to the present invention, the user equipment may further receive a PDCCH order signaling from a base station, and perform uplink synchronization with the base station in a secondary cell based on the received PDCCH order signaling. For example, the user equipment may identify different preambles reserved by the PDCCH order signaling for different secondary cells to determine the secondary cells for uplink synchronization. For another example, the user equipment may identify a field of CIF in the PDCCH order signaling to determine the secondary cells for uplink synchronization. For another example, the user equipment may determine whether to perform the uplink synchronization merely for specific secondary cells or for all secondary cells that have not performed the uplink synchronization, based on the PDCCH order signaling, e.g. the dedicated preamble or other contents in the signaling.

Then, the flow in FIG. 1 ends.

The present invention further discloses a method for initializing a secondary cell in a cellular communication system, and the method may be implemented by a base station (eNB) in the cellular communication system or any other appropriate devices available to those skilled in the art. In one embodiment according to the present invention, the base station may send a Radio Resource Control RRC configuration request to a user equipment so that the user equipment may perform a RRC configuration and perform uplink synchronization between the user equipment and the base station in the secondary cell.

In another embodiment according to the present invention, whether to perform uplink synchronization between a user equipment and a base station in a secondary cell may be indicated in a RRC configuration request.

In another embodiment according to the present invention, a dedicated preamble may be set in a RRC configuration request to indicate it is to be performed a non-contention uplink synchronization process. In a further embodiment, the dedicated preamble may not be set in a RRC configuration request, so as to indicate it is to be performed a contention uplink synchronization process.

In another embodiment according to the present invention, a message that a RRC configuration is completed sent by a user equipment may be received, wherein the sending of the RRC configuration complement message is independent of the performing of the uplink synchronization. The RRC configuration complement message may be sent in any cell in an activated state (e.g. an activated secondary cell or an activated primary cell), without being limited to an initialized secondary cell.

In another embodiment according to the present invention, a message that a RRC configuration is completed sent by a user equipment after performing unlink synchronization may be received. The RRC configuration complement message may be sent in a configured secondary cell.

In a cellular communication system according to the present invention, a base station may know a deployment scenario of a carrier and know which carrier is applied to what kind of secondary cell, and thereby the base station may know a future action of a user equipment. In another case, the base station may not know the deployment scenario of the carrier, and thereby the base station does not know the future action of the user equipment. Thus, in another embodiment according to the present invention, whether to use Timing Advance (TA) information of a configured secondary cell or primary cell may be indicated in a RRC configuration request. If the base station knows the future action of the user equipment, it may indicate that the user equipment uses or does not use any known TA information, and whether it is necessary to perform an uplink synchronization process to obtain new TA, etc. For example, the field indicating whether to use TA information in a RRC configuration message may be set as a certain known TA information or a cell identity corresponding to the TA information, e.g. a cell index. If the base station does not know the future action of the user equipment, then the base station does not indicate that the user equipment uses any known TA information, e.g. the field indicating whether to use the existing TA information in a RRC configuration message may be set as being empty (e.g. NULL).

In another embodiment according to the present invention, if the user equipment fails to successfully perform uplink synchronization with a base station in a secondary cell after receiving a RRC configuration request, e.g. the user equipment does not go to perform the uplink synchronization or fails in the process of performing the uplink synchronization, the base station may transmit a PDCCH order signaling to the user equipment to thereby retrigger the uplink synchronization between the user equipment and the base station in the secondary cell. For example, different preambles may be reserved for different secondary cells in the PDCCH order signaling to identify the secondary cells for uplink synchronization. For another example, a field of CIF may be set in the PDCCH order signaling to identify the secondary cells for uplink synchronization. For a further example, the PDCCH order signaling may be set to indicate whether to perform the uplink synchronization merely for specific secondary cells or for all secondary cells that have not performed the uplink synchronization.

Figure 2:
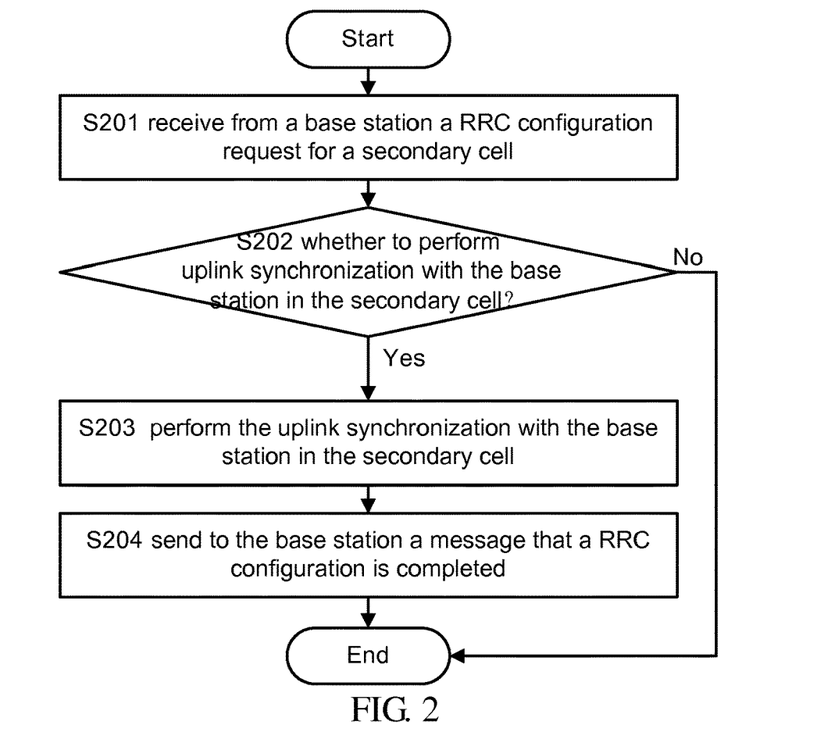
FIG. 2 is a flowchart of a method for initializing a secondary cell in a cellular communication system, according to another embodiment of the present invention.

FIG. 2 is a flowchart of a method for initializing a secondary cell in a cellular communication system, according to another embodiment of the present invention. The method may be implemented by a user equipment or by any other appropriate devices available to those skilled in the art.

In Step S201, it is received from a base station a RRC configuration request for a secondary cell.

In Step S202, whether to perform uplink synchronization with the base station in the secondary cell is judged.

In embodiments of the present invention, an indicator may be set in a RRC configuration request to indicate whether to perform uplink synchronization between a user equipment and a base station in a secondary cell. Thus, in Step 202, whether to perform uplink synchronization with the base station in the secondary cell may be judged based on the RRC configuration request. If an indicator is set in the RRC configuration request to indicate that it is necessary to perform uplink synchronization, the user equipment may determine performing Step 203 in accordance with the indication; otherwise, the user equipment does not perform any uplink synchronization process, and the flow ends. If the base station neither indicates performing the uplink synchronization process nor indicates using the existing TA, it belongs to the situation that it is determined not to use Timing Advance (TA) information of a configured secondary cell. In this situation, the user equipment may voluntarily perform the uplink synchronization process.

In Step S203, the uplink synchronization with a base station in a secondary cell is performed.

The user equipment may perform the uplink synchronization process by various implementations. For example, the user equipment may perform a non-contention uplink synchronization process or a contention uplink synchronization process based on whether a dedicated preamble is set in a RRC configuration request. For example, the user equipment may judge, based on an indication of the RRC configuration request, whether to use Timing Advance (TA) information of a configured secondary cell or primary cell, or to perform a random access process for the secondary cell. For example, the user equipment may determine whether it is necessary to configure a plurality of secondary cells based on an indication of the RRC configuration request, and determine whether to use the same TA information for the plurality of secondary cells. If it is determined that it is necessary to use the same TA information for a plurality of secondary cells, random access processes may be performed simultaneously or one by one for each of the plurality of secondary cells, and TA information may be obtained based on the firstly and successfully performed random access process. On the contrary, if it is determined that it is not necessary to use the same TA information for a plurality of secondary cells, random access processes may be performed simultaneously or one by one for each of the plurality of secondary cells to obtain TA information corresponding to each secondary cell and to respectively apply the obtained respective TA information to uplink transmission of each secondary cell.

In Step S204, a message that a RRC configuration is completed is sent to a base station.

In this embodiment, performing the uplink synchronization and sending the RRC configuration complement message have a strict order, which is, Step S203 is performed before Step S204. In addition, in this embodiment, the RRC configuration complement message is sent in a configured secondary cell.

Then, the flow in FIG. 2 ends.

Figure 3:
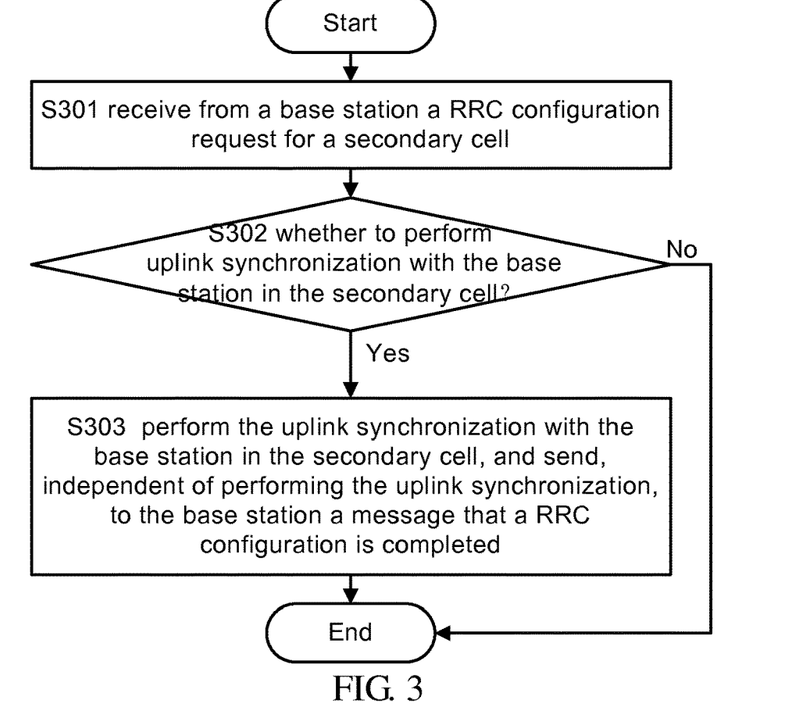
FIG. 3 is a flowchart of a method for initializing a secondary cell in a cellular communication system, according to another embodiment of the present invention.

FIG. 3 is a flowchart of a method for initializing a secondary cell in a cellular communication system, according to another embodiment of the present invention. The method may be performed by a user equipment or by any other appropriate devices available to those skilled in the art.

In Step S301, it is received from a base station a RRC configuration request for a secondary cell.

In Step S302, whether to perform uplink synchronization with the base station in the secondary cell is judged.

Similar to the embodiment illustrated by FIG. 2, in embodiments of the present invention, an indicator may also be set in a RRC configuration request to indicate whether to perform uplink synchronization between a user equipment and a base station in a secondary cell. Thus, in Step S302, whether to perform uplink synchronization with the base station in the secondary cell may be judged based on the RRC configuration request. If an indicator is set in the RRC configuration request to indicate that it is necessary to perform uplink synchronization, the user equipment may determine performing Step S303 based on the indication; otherwise, the user equipment does not perform the uplink synchronization process, and the flow ends.

In one embodiment according to the present invention, if the base station neither indicates performing the uplink synchronization process nor indicates using the existing TA, it belongs to the situation that it is determined not to use Timing Advance (TA) information of a configured secondary cell. In this situation, the user equipment may voluntarily perform the uplink synchronization process.

In Step S303, the uplink synchronization with a base station in a secondary cell is performed, and a message that a RRC configuration is completed is sent, independent of performing the uplink synchronization, to the base station.

In this embodiment, the message that a RRC configuration is completed is sent independent of performing the uplink synchronization. It is allowed to perform the uplink synchronization first and then send the RRC configuration complement message, or to send the RRC configuration complement message first and then perform the uplink synchronization. In addition, the RRC configuration complement message may be sent in any cell in an activated state (e.g. an activated secondary cell or an activated primary cell), without being limited to an initialized secondary cell.

Then, the flow in FIG. 3 ends.

Figure 4:
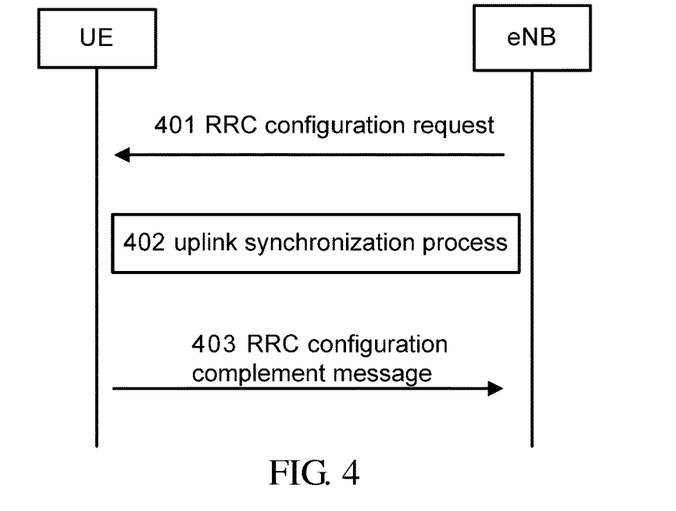
FIG. 4 is a schematic diagram of operations between a user equipment and a base station during the process of initializing a secondary cell.

FIG. 4 is a schematic diagram of operations between a user equipment and a base station during the process of initializing a secondary cell, according to the embodiment illustrated by FIG. 2. FIG. 4 illustrates the User Equipment (UE) and the base station (eNB). During the process of initializing the secondary cell, the eNB may send a RRC configuration request (Process 401) to the user equipment, and the UE may perform an uplink synchronization process (Process 402) with the eNB in the secondary cell based on triggering of the RRC configuration request. In addition, the UE may send, after a RRC configuration is completed, to the eNB a message that the RRC configuration request is completed (Process 403), and the message is sent independent of the uplink synchronization process. That is, the message that the RRC configuration request is completed is sent independent of whether the uplink synchronization process is completed, and independent of when the uplink synchronization process is performed.

Figure 5:
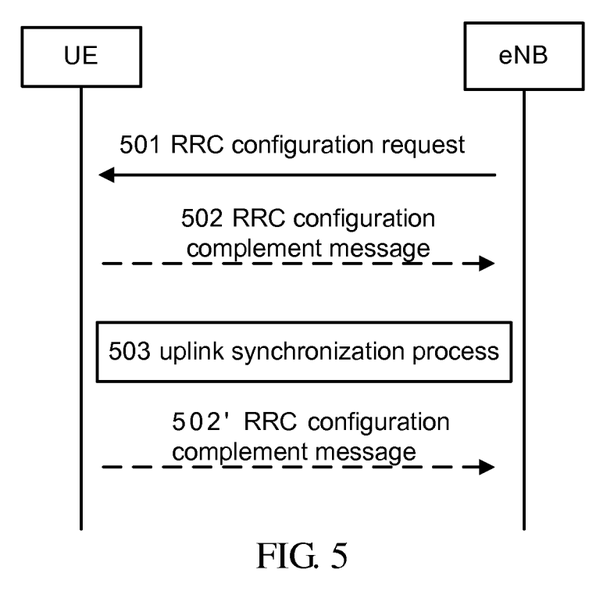
FIG. 5 is a schematic diagram of operations between a user equipment and a base station during the process of initializing a secondary cell.

FIG. 5 is a schematic diagram of operations between a user equipment and a base station during the process of initializing a secondary cell, according to the embodiment illustrated by FIG. 3. FIG. 5 illustrates the User Equipment (UE) and the base station (eNB). During the process of initializing the secondary cell, the eNB may send a RRC configuration request (Process 501) to the user equipment, and the UE may perform a RRC configuration process based on triggering of the RRC configuration request, and may send to the eNB a RRC configuration complement message after the RRC configuration process is performed (Process 502). In addition, the UE may, independent of sending the RRC configuration complement message, perform an uplink synchronization process with the eNB in the secondary cell (Process 503). It should be noted that since the sending of the RRC configuration complement message is independent of the uplink synchronization process, the RRC configuration complement message may be sent after the uplink synchronization is completed (Process 502'). In FIG. 5, Process 502 and Process 502' are marked by dashed lines, which means that the two processes are performed independent of the uplink synchronization process 503 and there is no strict sequential or parallel relationship between them.

Figure 6:
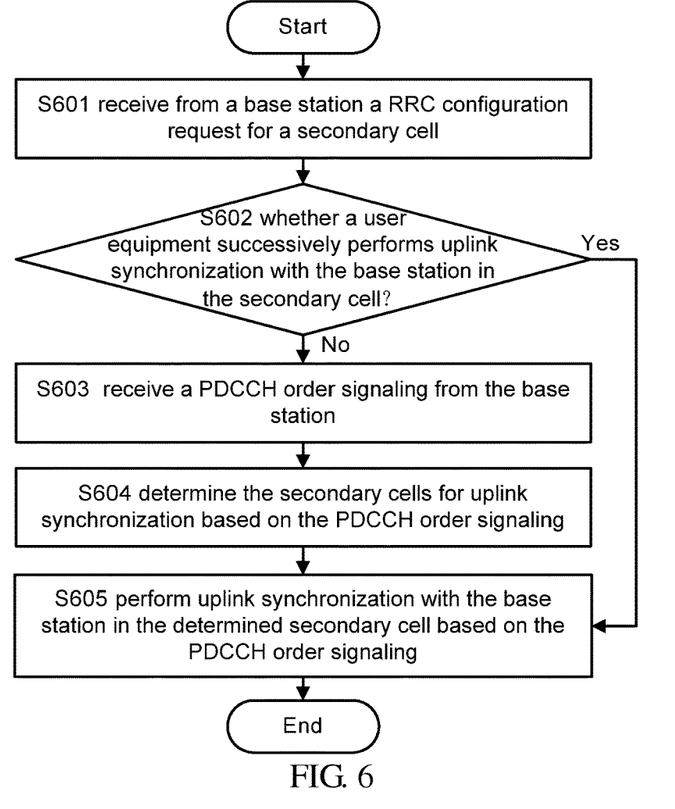
FIG. 6 is a flowchart of a method for initializing a secondary cell in a cellular communication system, according to another embodiment of the present invention.

FIG. 6 is a flowchart of a method for initializing a secondary cell in a cellular communication system, according to another embodiment of the present invention. The method may be performed by a user equipment or by any other appropriate devices available to those skilled in the art.

In the present invention, a new state is defined for the situation that the user equipment fails to successfully perform uplink synchronization with a base station in a secondary cell (e.g. the user equipment does not go to perform the uplink synchronization or fails in the process of performing the uplink synchronization) in response to receiving a RRC configuration request. The state is different from the "active" state or "deactive" state that a cell (a primary cell or a secondary cell) is usually in, but it is a new state. The new state may be called as a state "ready to be activated" or another name easy to be understood by those skilled in the art. In this new state, the user equipment may ignore contents for the secondary cell in the cell active MAC signaling and/or does not make a downlink measurement and report for the secondary cell. When the user equipment is in the state "ready to be activated", the base station may send PDCCH order signaling to the user equipment so as to retrigger the uplink synchronization between the user equipment and the base station in the secondary cell. The implementation is described in detail in Steps S601-S604.

In Step S601, it is received from a base station a RRC configuration request for a secondary cell.

In Step S602, whether a user equipment successfully performs uplink synchronization with the base station in the secondary cell is judged.

For example, it may be judged whether the user equipment has performed uplink synchronization with the base station in the secondary cell or whether the uplink synchronization fails. If the user equipment does not go to perform the uplink synchronization, or the user equipment goes to perform the uplink synchronization but the uplink synchronization is not successfully performed, the user equipment may be considered as failing to successfully perform uplink synchronization with the base station in the secondary cell, when Step S603 is performed. If the user equipment has successfully performed the uplink synchronization, the flow ends and it is unnecessary to trigger the performing of uplink synchronization by using the PDCCH order signaling.

In Step S603, a PDCCH order signaling is received from a base station.

In Step S604, a secondary cell for uplink synchronization is determined based on the PDCCH order signaling.

In embodiments of the present invention, the base station may reserve different preambles in the PDCCH order signaling for different secondary cells to identify the secondary cells for uplink synchronization; or set a field of CIF in the PDCCH order signaling to identify the secondary cells for uplink synchronization; or set the PDCCH order signaling as indicating whether to perform the uplink synchronization merely for specific secondary cells or for all secondary cells that have not performed the uplink synchronization. Thus, based on the received PDCCH order signaling, the user equipment may identify different preambles reserved for different secondary cells in the PDCCH order signaling to determine the secondary cells for which the uplink synchronization is to be performed; the user equipment may also identify the field of CIF in the PDCCH order signaling to determine the secondary cells for which the uplink synchronization is to be performed; additionally, the user equipment may determine, based on one or more dedicated preambles or other contents in the PDCCH order signaling, whether to perform the uplink synchronization merely for specific secondary cells or for all secondary cells that have not performed perform the uplink synchronization, to thereby obtain a set of the secondary cells for which the uplink synchronization is to be performed.

In Step S605, the uplink synchronization with the base station in the determined secondary cells is performed based on the PDCCH order signaling.

This step is similar to performing the uplink synchronization triggered by the RRC configuration request. For example, the Step S605 may be carried out in accordance with the implementations of the uplink synchronization described in Step S102 or S203.

Then, the flow in FIG. 6 ends.

Figure 7:
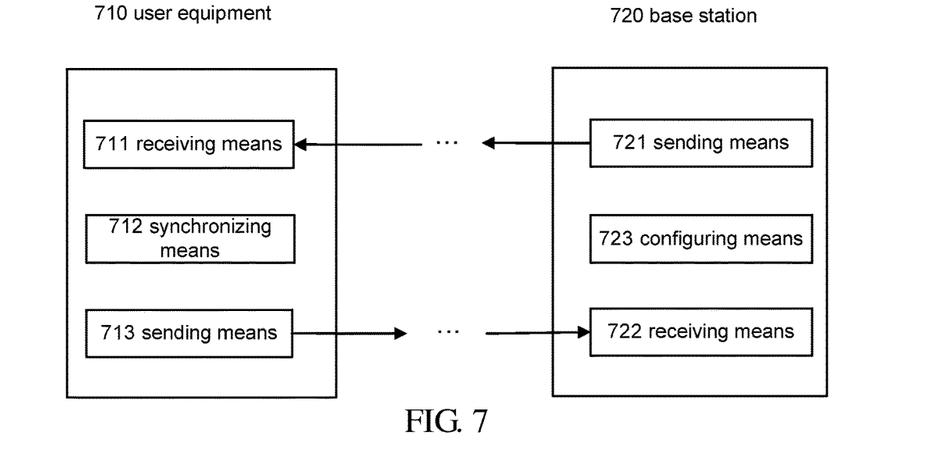
FIG. 7 is a schematic diagram of a user equipment and a base station for the process of initializing a secondary cell, according to one embodiment of the present invention.

FIG. 7 is a schematic diagram of a user equipment and a base station for initializing a secondary cell, according to one embodiment of the present invention.

In one embodiment according to the present invention, the user equipment 710 shown in FIG. 7 may comprise: receiving means 711, which may be configured to receive from a base station a Radio Resource Control RRC configuration request for a secondary cell to perform a RRC configuration; and synchronizing means 712, which may be configured to perform, in response to receiving the RRC configuration request, uplink synchronization with the base station in the secondary cell. In addition, the user equipment 710 may further comprise sending means 713, which may be configured to send to the base station a message that a RRC configuration is completed.

According to one embodiment of the present invention, the synchronizing means 712 of the user equipment 710 may comprise: means configured to receive a PDCCH order signaling from the base station; and means configured to perform uplink synchronization with the base station in the secondary cell based on the PDCCH order signaling.

According to one embodiment of the present invention, the synchronizing means 712 of the user equipment 710 may comprise: means configured to identify different preambles reserved by PDCCH order signaling for different secondary cells to determine the secondary cells for uplink synchronization; or means configured to identify a field of CIF in PDCCH order signaling to determine the secondary cells for uplink synchronization; or means configured to determine based on PDCCH order signaling whether to perform uplink synchronization for specific secondary cells or for all secondary cells that have not performed the uplink synchronization.

According to one embodiment of the present invention, the synchronizing means 712 of the user equipment 710 may comprise: means configured to determine whether to perform uplink synchronization with a base station in a secondary cell based on a RRC configuration request.

According to one embodiment of the present invention, the synchronizing means 712 of the user equipment 710 may further comprise: means configured to determine whether a dedicated preamble has been set in a RRC configuration request; means configured to perform a non-contention uplink synchronization process in response to determining that a dedicated preamble has been set; and means configured to perform a contention uplink synchronization process in response to determining that no dedicated preamble has been set.

According to one embodiment of the present invention, the synchronizing means 712 of the user equipment 710 may comprise: means configured to, based on the RRC configuration request, determine whether to use Timing Advance TA information of a secondary cell or primary cell which has been configured; and means configured to, in response to determining not to use Timing Advance TA information of a secondary cell which has been configured, perform a random access process for the secondary cell.

According to one embodiment of the present invention, the synchronizing means 712 of the user equipment 710 may comprise: means configured to determine whether it is necessary to configure a plurality of secondary cells based on the RRC configuration request; means configured to, in response to determining that it is necessary to configure a plurality of secondary cells, determine whether to use the same TA information for the plurality of secondary cells; means configured to, if the same TA information is used for the plurality of secondary cells, perform random access processes simultaneously or one by one for each of the plurality of secondary cells, and obtain TA information based on the first successfully-performed random access process for use in uplink transmission of each secondary cell; and means configured to, if the same TA information is not used for the plurality of secondary cells, perform random access processes simultaneously or one by one for each of the plurality of secondary cells to obtain TA information corresponding to each secondary cell for use in uplink transmission of the each secondary cell.

According to one embodiment of the present invention, the user equipment 710 may further comprise: sending means 713, which may be configured to send to the base station a message that a RRC configuration is completed, wherein the message is sent independent of performing the uplink synchronization.

According to one embodiment of the present invention, the user equipment 710 may further comprise: sending means 713, which may be configured to send, after performing the uplink synchronization, to the base station a message that a RRC configuration is completed.

According to one embodiment of the present invention, if a user equipment 710 fails to perform uplink synchronization with the base station in the secondary cell or the uplink synchronization fails, contents for the secondary cell in cell active MAC signaling are ignored and/or downlink measurement and report for the secondary cell are not performed.

In one embodiment according to the present invention, a base station 720 shown in FIG. 7 may comprise a sending means 721. The sending means 721 may be configured to send a RRC configuration request and/or PDCCH order signaling. In addition, the base station 720 may comprise: receiving means 722 configured to receive a message that a RRC configuration request is completed. In addition, the base station 720 may further comprise configuring means 723.

According to one embodiment of the present invention, the sending means 721 may comprise a RRC configuration request sending unit configured to send a Radio Resource Control RRC configuration request to a user equipment so that the user equipment performs a RRC configuration and performs uplink synchronization between the user equipment and a base station in the secondary cell.

According to one embodiment of the present invention, the sending means 721 may comprise a PDCCH order signaling sending unit configured to send to the user equipment a PDCCH order signaling so that the uplink synchronization between the user equipment and the base station in the secondary cell is performed.

According to one embodiment of the present invention, the receiving means 722 may be configured to receive from a user equipment a message that a RRC configuration is completed, wherein the message is sent independent of performing uplink synchronization.

According to one embodiment of the present invention, the receiving means 722 may be configured to receive from a user equipment a message that a RRC configuration is completed, after performing uplink synchronization.

According to one embodiment of the present invention, the configuring means 723 may comprise: means configured to reserve different preambles in the PDCCH order signaling for different secondary cells to identify a secondary cell to perform the uplink synchronization; or means configured to set a field of CIF in the PDCCH order signaling to identify the secondary cells for uplink synchronization; or means configured to set the PDCCH order signaling to indicate whether to perform the uplink synchronization merely for specific secondary cells or for all secondary cells that have not performed the uplink synchronization.

According to one embodiment of the present invention, configuring means 723 may comprise: means configured to indicate, in the RRC configuration request, whether to perform uplink synchronization between the user equipment and the base station in the secondary cell.

According to one embodiment of the present invention, configuring means 723 may comprise: means configured to set a dedicated preamble in the RRC configuration request to indicate performing a non-contention uplink synchronization process; or means configured to set no dedicated preamble in the RRC configuration request to indicate performing a contention uplink synchronization process.

According to one embodiment of the present invention, configuring means 723 may comprise: means configured to indicate, in the RRC configuration request, whether to use Timing Advance TA information of a secondary cell or primary cell which has been configured.

According to one embodiment of the present invention, configuring means 723 may comprise: means configured to indicate, in the RRC configuration request, whether the user equipment needs to configure a plurality of secondary cells and whether the same TA information is to be used for these secondary cells.

By using the method and apparatus for initializing a secondary cell in a cellular communication system according to the present invention, a RRC configuration request or PDCCH order signaling may be used to trigger uplink synchronization between a user equipment and a base station in a secondary cell to thereby perform uplink synchronization between a user equipment and a base station in a secondary cell in LTE Release 11.

The method disclosed by the present invention may be implemented in software, hardware or a combination of software and hardware. The hardware portion may be implemented by a dedicated logic; the software portion may be stored in a memory and be performed by an appropriate instruction executing system, e.g. a microprocessor, a Personal Computer (PC) or a mainframe.

It should be noted that for facilitating understanding of the present invention easier to understand, some more specific technical details that are well-known to those skilled in the art and may be necessary for implementing the present invention are omitted in the above descriptions.

The specification of the present invention is provided for explanation and description purposes, rather than exhausting or limiting the present invention as the disclosed form. For those of ordinary skill in the art, many modifications and changes are available.

Thus, selecting and describing the embodiments is to better explain the principle of the actual application of the present invention, and to enable those of ordinary skill in the art to understand that, without departure from the essence of the present invention, all modifications and changes fall into the protection scope of the present invention defined by the claims.

What is claimed is:

1. A method for initializing a secondary cell in a cellular communication system, comprising:
   receiving at a user equipment from a base station a Radio Resource Control RRC configuration request for the secondary cell to perform the RRC configuration; and
   performing, in response to receiving the RRC configuration request, uplink synchronization with the base station in the secondary cell;
   wherein the performing, in response to receiving the RRC configuration request, uplink synchronization with the base station in the secondary cell comprises:
   receiving a Physical Downlink Control Channel PDCCH order signaling from the base station; and
   performing uplink synchronization with the base station in the secondary cell based on the PDCCH order signaling, including identifying a field of Carrier Indicator Field CIF in the PDCCH order signaling to determine the secondary cells for uplink synchronization, wherein
   contents for the secondary cell in cell active Medium Access Control MAC signaling are ignored and a PDCCH order signaling to retrigger the uplink synchronization between the user equipment and the base station in the secondary cell is received.

2. The method according to claim 1, wherein performing uplink synchronization with the base station in the secondary cell based on the PDCCH order signaling further comprising:
   identifying different preambles reserved by the PDCCH order signaling for different secondary cells to determine the secondary cells for uplink synchronization; or
   determining, based on the PDCCH order signaling, whether to perform uplink synchronization merely for specific secondary cells or for all secondary cells that have not performed the uplink synchronization.

3. The method according to claim 1, wherein performing uplink synchronization with the base station in the secondary cell comprises:
   determining whether to perform the uplink synchronization with the base station in the secondary cell based on the RRC configuration request.

4. The method according to claim 1, further comprising:
   determining whether a dedicated preamble has been set in the RRC configuration request;
   in response to determining that a dedicated preamble has been set, performing a non-contention uplink synchronization process; and
   in response to determining that no dedicated preamble has been set, performing a contention uplink synchronization process, wherein a mechanism for solving a conflict may also be included.

5. The method according to claim 1, further comprising:
   sending to the base station a message that a RRC configuration is completed, wherein the message is sent independent of performing the uplink synchronization.

6. The method according to claim 1, further comprising:
   after performing the uplink synchronization, sending to the base station a message that a RRC configuration is completed.

7. The method according to claim 1, wherein performing uplink synchronization with the base station in the secondary cell comprises:
   determining, based on the RRC configuration request, whether to use Timing Advance TA information of a secondary cell or primary cell which has been configured;
   wherein determining includes:
   in response to determining not to use Timing Advance TA information of a secondary cell which has been configured, performing a random access process for the secondary cell; or in response to determining to use Timing Advance TA information of the configured secondary cell, the TA information may be used for uplink transmission of the secondary cell.

8. The method according to claim 1, wherein performing uplink synchronization with the base station in the secondary cell comprises:
   determining whether it is necessary to configure a plurality of secondary cells based on the RRC configuration request;
   in response to determining that it is necessary to configure a plurality of secondary cells, determining whether the same Timing Advance TA information is used for the plurality of secondary cells;
   if the same TA information is used for the plurality of secondary cells, performing random access processes simultaneously or one by one for each of the plurality of secondary cells, and obtaining TA information based on the first successfully-performed random access process for use in uplink transmission of each secondary cell; and
   if the same TA information is not used for the plurality of secondary cells, performing random access processes simultaneously or one by one for each of the plurality of secondary cells to obtain TA information corresponding to each secondary cell for use in uplink transmission of the each secondary cell.

9. A method for initializing a secondary cell in a cellular communication system, comprising:
   sending to a user equipment a Radio Resource Control RRC configuration request so that the user equipment performs a RRC configuration and performs uplink synchronization between the user equipment and a base station in the secondary cell; and
   sending to the user equipment a Physical Downlink Control Channel PDCCH order signaling so that the uplink synchronization between the user equipment and the base station in the secondary cell is performed, including setting a field of CIF in the PDCCH order signaling to identify the secondary cells for uplink synchronization; wherein
   contents for the secondary cell in cell active Medium Access Control MAC signaling are ignored and a PDCCH order signaling to the user equipment to retrigger the uplink synchronization between the user equipment and the base station in the secondary cell is transmitted.

10. The method according to claim 9, wherein sending to the user equipment a PDCCH order signaling further comprises:
reserving different preambles in the PDCCH order signaling for different secondary cells to identify a secondary cell to perform the uplink synchronization; or
setting the PDCCH order signaling to indicate whether to perform the uplink synchronization merely for specific secondary cells or for all secondary cells that have not performed the uplink synchronization.

11. A user equipment for initializing a secondary cell in a cellular communication system, comprising:
at least one processor; and
at least one memory including computer program code;
the at least one memory and the computer program code configured to, with the at least one processor, cause the user equipment at least to perform:
receiving from a base station a Radio Resource Control RRC configuration request for the secondary cell to perform RRC configuration; and
performing, in response to receiving the RRC configuration request, uplink synchronization with the base station in the secondary cell;
receiving a Physical Downlink Control Channel PDCCH order signaling from the base station;
performing uplink synchronization with the base station in the secondary cell based on the PDCCH order signaling, including identifying a field of Carrier Indicator Field CIF in the PDCCH order signaling to determine the secondary cells for uplink synchronization; wherein
contents for the secondary cell in cell active Medium Access Control MAC signaling are ignored and a PDCCH order signaling to retrigger the uplink synchronization between the user equipment and the base station in the secondary cell is received.

12. A base station for initializing a secondary cell in a cellular communication system, comprising:
at least one processor; and
at least one memory including computer program code;
the at least one memory and the computer program code configured to, with the at least one processor, cause the base station at least to perform:
sending a Radio Resource Control RRC configuration request to a user equipment so that the user equipment performs a RRC configuration and performs uplink synchronization between the user equipment and a base station in the secondary cell;
sending a PDCCH order signaling so that the uplink synchronization between the user equipment and the base station in the secondary cell is performed, including identifying a field of Carrier Indicator Field CIF in the PDCCH order signaling to determine the secondary cells for uplink synchronization, wherein
contents for the secondary cell in cell active Medium Access Control MAC signaling are ignored and a PDCCH order signaling to the user equipment to retrigger the uplink synchronization between the user equipment and the base station in the secondary cell is transmitted.

13. A method, in a user equipment, for initializing a secondary cell in a cellular communication system, comprising:
receiving from a base station a Radio Resource Control (RRC) configuration request for the secondary cell to perform the RRC configuration; and
performing, in response to receiving the RRC configuration request, uplink synchronization with the base station in the secondary cell;
wherein the performing, in response to receiving the RRC configuration request, uplink synchronization with the base station in the secondary cell comprises:
receiving a Physical Downlink Control Channel (PDCCH) order signaling from the base station; and
performing uplink synchronization with the base station in the secondary cell based on the PDCCH order signaling, including identifying a field of Carrier Indicator Field (CIF) in the PDCCH order signaling to determine the secondary cells for uplink synchronization,
wherein performing uplink synchronization with the base station in the secondary cell based on the PDCCH order signaling further comprises:
identifying different preambles reserved by the PDCCH order signaling for different secondary cells to determine the secondary cells for uplink synchronization.

14. The method according to claim 13, wherein performing uplink synchronization with the base station in the secondary cell based on the PDCCH order signaling further comprises:
determining, based on the PDCCH order signaling, whether to perform uplink synchronization merely for specific secondary cells or for all secondary cells that have not performed the uplink synchronization.

15. The method according to claim 13, wherein performing uplink synchronization with the base station in the secondary cell comprises:
determining whether to perform the uplink synchronization with the base station in the secondary cell based on the RRC configuration request.

16. The method according to claim 13, further comprising:
determining whether a dedicated preamble has been set in the RRC configuration request;
in response to determining that a dedicated preamble has been set, performing a non-contention uplink synchronization process; and
in response to determining that no dedicated preamble has been set, performing a contention uplink synchronization process, wherein a mechanism for solving a conflict may also be included.

17. The method according to claim 13, further comprising:
sending to the base station a message that a RRC configuration is completed, wherein the message is sent independent of performing the uplink synchronization.

18. The method according to claim 13, further comprising:
after performing the uplink synchronization, sending to the base station a message that a RRC configuration is completed.

19. The method according to claim 18, wherein the RRC configuration completed message is sent in a configured secondary cell.

20. The method according to claim 13, wherein performing uplink synchronization with the base station in the secondary cell comprises:
determining, based on the RRC configuration request, whether to use Timing Advance TA information of a secondary cell or primary cell which has been configured;

wherein determining includes:
in response to determining not to use Timing Advance TA information of a secondary cell which has been configured, performing a random access process for the secondary cell; or
in response to determining to use Timing Advance TA information of the configured secondary cell, the TA information may be used for uplink transmission of the secondary cell.

21. The method according to claim 13, wherein performing uplink synchronization with the base station in the secondary cell comprises:
determining whether it is necessary to configure a plurality of secondary cells based on the RRC configuration request;
in response to determining that it is necessary to configure a plurality of secondary cells, determining whether the same Timing Advance TA information is used for the plurality of secondary cells;
if the same TA information is used for the plurality of secondary cells, performing random access processes simultaneously or one by one for each of the plurality of secondary cells, and obtaining TA information based on the first successfully-performed random access process for use in uplink transmission of each secondary cell; and
if the same TA information is not used for the plurality of secondary cells, performing random access processes simultaneously or one by one for each of the plurality of secondary cells to obtain TA information corresponding to each secondary cell for use in uplink transmission of each secondary cell.

22. A method, in a base station, for initializing a secondary cell in a cellular communication system, comprising:
sending to a user equipment a Radio Resource Control (RRC) configuration request so that the user equipment performs a RRC configuration and performs uplink synchronization between the user equipment and a base station in the secondary cell; and
sending to the user equipment a Physical Downlink Control Channel (PDCCH) order signaling so that the uplink synchronization between the user equipment and the base station in the secondary cell is performed, including setting a field of Carrier Indicator Field (CIF) in the PDCCH order signaling to identify the secondary cells for uplink synchronization, wherein the uplink synchronization between the user equipment and the base station in the secondary cell based on the PDCCH order signaling further comprises:
identifying different preambles reserved by the PDCCH order signaling for different secondary cells to determine the secondary cells for uplink synchronization.

23. The method according to claim 22, wherein sending to the user equipment a PDCCH order signaling further comprises:
reserving different preambles in the PDCCH order signaling for different secondary cells to identify a secondary cell to perform the uplink synchronization; or
setting the PDCCH order signaling to indicate whether to perform the uplink synchronization merely for specific secondary cells or for all secondary cells that have not performed the uplink synchronization.

24. A user equipment for initializing a secondary cell in a cellular communication system, comprising:
at least one processor; and
at least one memory including computer program code;
the at least one memory and the computer program code configured to, with the at least one processor, cause the user equipment at least to perform:
receiving from a base station a Radio Resource Control (RRC) configuration request for the secondary cell to perform RRC configuration; and
performing, in response to receiving the RRC configuration request, uplink synchronization with the base station in the secondary cell;
receiving a Physical Downlink Control Channel (PDCCH) order signaling from the base station;
performing uplink synchronization with the base station in the secondary cell based on the PDCCH order signaling, including identifying a field of Carrier Indicator Field (CIF) in the PDCCH order signaling to determine the secondary cells for uplink synchronization,
wherein performing uplink synchronization with the base station in the secondary cell based on the PDCCH order signaling further comprises:
identifying different preambles reserved by the PDCCH order signaling for different secondary cells to determine the secondary cells for uplink synchronization.

25. The user equipment according to claim 24, wherein the at least one memory and the computer program code are configured to, with the at least one processor, cause the user equipment at least to perform:
after performing the uplink synchronization, sending to the base station a message that a RRC configuration is completed, wherein the RRC configuration completed message is sent in a configured secondary cell.

26. A base station for initializing a secondary cell in a cellular communication system, comprising:
at least one processor; and
at least one memory including computer program code;
the at least one memory and the computer program code configured to, with the at least one processor, cause the base station at least to perform:
sending a Radio Resource Control (RRC) configuration request to a user equipment so that the user equipment performs a RRC configuration and performs uplink synchronization between the user equipment and a base station in the secondary cell;
sending a Physical Downlink Control Channel (PDCCH) order signaling so that the uplink synchronization between the user equipment and the base station in the secondary cell is performed, including identifying a field of Carrier Indicator Field (CIF) in the PDCCH order signaling to determine the secondary cells for uplink synchronization, wherein the uplink synchronization between the user equipment and the base station in the secondary cell based on the PDCCH order signaling further comprises:
identifying different preambles reserved by the PDCCH order signaling for different secondary cells to determine the secondary cells for uplink synchronization.

* * * * *